United States Patent [19]

Grava et al.

[11] Patent Number: 5,023,007
[45] Date of Patent: Jun. 11, 1991

[54] LIQUID REFRIGERANT COMPOSITIONS

[75] Inventors: Arturs Grava, Mayfield Hts.; Scott T. Jolley, Mentor, both of Ohio

[73] Assignee: The Lubrizol Corporation, Wickliffe, Ohio

[21] Appl. No.: 498,234

[22] Filed: Mar. 23, 1990

Related U.S. Application Data

[62] Division of Ser. No. 269,894, Nov. 10, 1988.

[51] Int. Cl.$^5$ ............................................. C09K 5/00
[52] U.S. Cl. ............................. 252/67; 252/51.5 A; 252/68; 252/69
[58] Field of Search ............. 252/47, 48.6, 50, 51.5 R, 252/51.5 A, 52 R, 54.6, 56 R, 56 D, 57, 67, 68, 69

[56] References Cited

U.S. PATENT DOCUMENTS

| | | | |
|---|---|---|---|
| 3,400,075 | 7/1968 | Grimm et al. | 252/51.5 A |
| 4,248,726 | 2/1981 | Uchinuma et al. | 252/52 A |
| 4,267,064 | 5/1981 | Sasaki et al. | 252/52 A |
| 4,396,516 | 8/1983 | Kinoshita et al. | 252/51.5 A |
| 4,428,854 | 1/1984 | Enjo et al. | 252/69 |
| 4,431,557 | 2/1984 | Shimizu et al. | 252/52 A |
| 4,454,052 | 6/1984 | Shozi et al. | 252/68 |
| 4,482,464 | 11/1984 | Karol et al. | 252/51.5 R |
| 4,559,154 | 12/1985 | Powell | 252/69 |
| 4,612,133 | 9/1986 | Bertocchio et al. | 252/68 |
| 4,755,316 | 7/1988 | Magid et al. | 252/68 |

FOREIGN PATENT DOCUMENTS

| | | |
|---|---|---|
| 0048281 | 3/1982 | European Pat. Off. |
| 0167450 | 1/1986 | European Pat. Off. |
| 0184351 | 6/1986 | European Pat. Off. |
| 3200736 | 7/1983 | Fed. Rep. of Germany |
| 3300023 | 7/1984 | Fed. Rep. of Germany |
| 3315530 | 11/1984 | Fed. Rep. of Germany |
| 3323108 | 1/1985 | Fed. Rep. of Germany |
| 3418705 | 12/1985 | Fed. Rep. of Germany |
| 3623680 | 1/1988 | Fed. Rep. of Germany |

*Primary Examiner*—Josephine Barr
*Assistant Examiner*—William S. Parks
*Attorney, Agent, or Firm*—Robert A. Franks; Forrest L. Collins; Frederick D. Hunter

[57] ABSTRACT

This invention relates to a liquid composition comprising
(A) a major amount of a fluorine-containing hydrocarbon, and
(B) a minor amount of a soluble organic lubricant free of acetylenic and aromatic unsaturation and comprising a cyclic compound characterized by the following structure

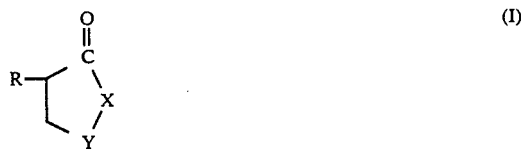

wherein
R is H, a hydrocarbyl group, or —R$^2$COOR$^1$,
X is O or NR$^3$,
Y is CHR$^4$, C=O, C=NR$^5$,
R$^1$ is H or a lower hydrocarbyl group,
R$^2$ is an alkylene group,
R$^3$ is H, a hydrocarbyl group, an alkylene group joined to R$^5$ when Y is C=N—R$^5$ to form a cyclic moiety, —R$^6$OR$^7$, or —R$^8$NR$^9$R$^{10}$,
R$^4$ is H or a hydrocarbyl group,
R$^5$ is H or an alkylene group joined with R$^3$ when X is NR$^3$ to form a cyclic moiety,
R$^6$ is an alkylene group,
R$^7$ is H or a hydrocarbyl group,
R$^8$ is an alkylene group, and
R$^9$ and R$^{10}$ are each independently H or hydrocarbyl groups, or R$^9$ and R$^{10}$ are hydrocarbylene groups joined together to form a heterocyclic moiety, provided that when Y is CH$_2$ and X is NR$^3$, R$^3$ is not a hydrocarbyl group.

14 Claims, No Drawings

LIQUID REFRIGERANT COMPOSITIONS

This is a divisional of copending application Ser. No. 269,894, filed on Nov. 10, 1988.

FIELD OF THE INVENTION

This invention relates to liquid compositions comprising a major amount of a fluorine-containing hydrocarbon, and a minor amount of a lubricant. More particularly, the invention relates to liquid compositions useful as refrigeration liquids.

BACKGROUND OF THE INVENTION

Chlorofluorocarbons, generally referred to in the industry as CFCs, have been widely used as propellants in aerosols, although use in aerosols has been diminishing in recent years because of demands of environmentalists for the reduction if not a complete ban on the use of CFCs because of the detrimental effect of CFCs on the atmosphere's ozone layer. CFCs also have been used because of their unique combination of properties as refrigerants, foam-blowing agents, and specialty solvents within the electronics and aerospace industries. Examples of CFCs which have been utilized for these purposes include CFC-11 which is chlorotrifluoromethane, CFC-12 which is dichlorodifluoromethane, and CFC-113 which is 1,2,2-trifluoro-1,1,2-trichloroethane.

Since 1976, when the aerosol industry began to feel the pressure to reduce if not eliminate the use of CFCs, the aerosol industry has progressively moved toward the substitution of hydrocarbon propellants for CFC propellants. The hydrocarbons, such as butane, are readily available and inexpensive, and the quality of the final product generally has been unaffected by the substitution of propellants. However, the problem of finding a safe replacement of CFC refrigerants and foam-blowing agents has been more difficult to solve. Several replacement candidates have been suggested as alternatives to the fully halogenated hydrocarbons, and these include halogenated hydrocarbons containing at least some hydrogen atoms such as HCFC-22 which is difluorochloromethane, HCFC-123 which is 1,1-dichloro-2,2,2-trifluoroethane, HFC-134a which is 1,1,1,2-tetrafluoroethane and HCFC-141b which is 1,1-dichloro-1-fluoroethane.

The ozone depletion potential of these proposed substitutes is significantly less than the ozone depletion potential of the previously used CFCs. The ozone depletion potential is a relative measure of the capability of the material to destroy the ozone layer in the atmosphere. It is a combination of the percentage by weight of chlorine (the atom that attacks the ozone molecule) and the lifetime in the atmosphere. HCFC-22 and HFC-134a generally are recommended as being candidates in refrigerant applications, and HFC-134a is particularly attractive because its ozone depletion potential has been reported as being zero.

In order for any of the replacement materials to be useful as refrigerants, the materials must be compatible with the lubricant utilized in the compressor. The presently used refrigerants such as CFC-12 are readily compatible with mineral lubricating oils which are utilized as the lubricant in air-conditioner compressors. The above-described refrigerant candidates, however, have different solubility characteristics than the refrigerants presently in use. For example, mineral lubricating oil is incompatible (i.e., insoluble) with HFC-134a. Such incompatibility results in unacceptable compressor life in compression-type refrigeration equipment including refrigerators and air-conditioners including auto, home and industrial air-conditioners. The problem is particularly evident in automotive air-conditioning systems since the compressors are not separately lubricated, and a mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

Compositions comprising a tetrafluoroethane and polyoxyalkylene glycols are discussed in U.S. Pat. No. 4,755,316. The compositions are useful in refrigeration systems. Refrigeration oils are described in U.S. Pat. Nos. 4,248,726 and 4,267,064 which comprise mixtures of a polyglycol and 0.1 to 10% of glycidyl ether type epoxy compounds, or epoxidized fatty acid monoesters, and optionally, epoxidized vegetable oil. The lubricating oils are reported to be useful in refrigerators using a halogen-containing refrigerant such as Freons 11, 12, 13, 22, 113, 114, 500 and 502 (available from DuPont), and in particular with Freon 12 or 22.

U.S. Pat. No. 4,431,557 describes fluid compositions comprised of a fluorine-containing hydrocarbon refrigerant, a hydrocarbon oil, and an alkylene oxide additive compound which improves the thermal resistance of the oil in the presence of the refrigerant. Examples of hydrocarbon oils include mineral oil, alkyl benzene oil, dibasic acid ester oil, polyglycols, etc. The composition may contain other additives including load-carrying additives such as phosphorus acid esters, phosphoric acid esters, etc. Examples of fluorocarbon refrigerants include R-11, R-12, R-113, R-114, R-500, etc.

U.S. Pat. No. 4,428,854 describes absorption refrigerant compositions for use in refrigeration systems comprising 1,1,1,2-tetrafluoroethane and an organic solvent capable of dissolving the ethane. Among the solvents disclosed are organic amides, acetonitrile, N-methyl pyrroles, N-methyl pyrrolidine, N-methyl-2-pyrrolidone, nitromethane, various dioxane derivatives, glycol ethers, butyl formate, butyl acetate, diethyl oxalate, diethyl malonate, acetone, methyl ethyl ketone, other ketones and aldehydes, triethyl phosphoric triamide, triethylene phosphate, triethyl phosphate, etc.

Stabilized absorption compositions comprising (a) a halogenated hydrocarbon refrigerant, (b) a liquid absorbent of a polyethylene glycol methyl ether, and (c) at least one stabilizer are described in U.S. Pat. No. 4,454,052. Examples of stabilizers include phosphate esters, epoxy compounds, and organotin compounds. The polyethylene glycol methyl ether-type compounds are of the general formula $$CH_3-O-(CH_2H_4)_nR$$

wherein n is an integer of 1 to 6, and R is H, CH₃— or CH₃CO—. A variety of halogenated hydrocarbons are described including 1,1,-difluoromethane, 1,1,1,2-tetrafluoroethane, etc.

U.S. Pat. No. 4,559,154 relates to absorption heat pumps utilizing as working fluid, a saturated fluorohydrocarbon or fluorohydrocarbon ether having from 3 to carbon atoms. Solvents reported to be useful with such fluorohydrocarbons include ethers such as tetraglyme, amides which can be lactams such as the N-alkyl pyrrolidones, sulfonamides and ureas including cyclic ureas.

SUMMARY OF THE INVENTION

A liquid composition is described which comprises (A) a major amount of a fluorine-containing hydrocarbon, and (B) a minor amount of a soluble organic lubricant free of acetylenic and aromatic unsaturation and comprising a cyclic compound characterized by the following structure

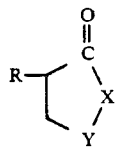  (I)

wherein

R is H, a hydrocarbyl group, or —R²COOR¹,

X is O or NR³,

Y is CHR⁴, C=O, C=NR⁵,

R¹ is H or a lower hydrocarbyl group,

R² is an alkylene group,

R³ is H, a hydrocarbyl group, an alkylene group joined to R⁵ when Y is C=N—R⁵ to form a cyclic moiety, —R⁶OR⁷, or —R⁸NR⁹R¹⁰, R⁴ is H or a hydrocarbyl group, R⁵ is H or an alkylene group joined with R³ when X is NR³ to form a cyclic moiety, R⁶ is an alkylene group, R⁷ is H or a hydrocarbyl group, R⁸ is an alkylene group, and R⁹ and R¹⁰ are each independently H or hydrocarbyl groups, or R⁹ and R¹⁰ are hydrocarbylene groups joined together to form a heterocyclic moiety, provided that when Y is CH₂ and X is NR³, R³ is not a hydrocarbyl group.

The liquid compositions of the invention exhibit excellent thermal stability and are useful particularly as refrigeration liquids in refrigerators and air-conditioners including auto, home, and industrial air-conditioners.

DESCRIPTION OF THE PREFERRED EMBODIMENTS

Throughout this specification and claims, all parts and percentages are by weight, temperatures are in degrees Celsius, and pressures are atmospheric unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, alkyl, alkenyl, alkoxy, and the like, is intended to describe such groups which contain a total of up to 7 carbon atoms.

(A) Fluorine-Containing Hydrocarbon

The liquid compositions of the present invention comprise a major amount of a fluorine-containing hydrocarbon. That is, the fluorine-containing hydrocarbons contain at least one C—H bond as well as C—F bonds. In addition to these two essential types of bonds, the hydrocarbon also may contain other carbon-halogen bonds such as C—Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, hydrogen and fluorine are referred to herein as fluorohydrocarbons. The hydrocarbons containing chlorine as well as fluorine and hydrogen are referred to as chlorofluorohydrocarbons. The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering, pp. 33-34, July, 1988.

Examples of other fluorine-containing hydrocarbons which may be useful in the liquid compositions of the present invention include trifluoromethane, 1,1,1-trifluoroethane, 1,1-difluoroethane, and 1,1,2,2-tetrafluoroethane.

In general, fluorine-containing hydrocarbons which are useful as refrigerants are fluoromethanes and fluoroethanes boiling at a relatively low temperature at atmospheric pressure, e.g., below 30° C. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise from about 50% to about 99% by weight of the fluorine-containing hydrocarbon. In another embodiment, the liquid compositions contain from about 70% to about 99% by weight of the fluorine-containing hydrocarbon.

(B) Soluble Organic Lubricant

In addition to the fluorine-containing hydrocarbon, the liquid compositions of the present invention contain a minor amount of a soluble organic lubricant free of acetylenic and aromatic unsaturation and comprising a cyclic compound characterized by the following structure

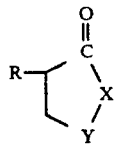
(I)

wherein
R is H, a hydrocarbyl group, or $-R^2COOR^1$,
X is O or $NR^3$,
Y is $CHR^4$, C=O, $C=NR^5$,
$R^1$ is H or a lower hydrocarbyl group,
$R^2$ is an alkylene group,
$R^3$ is H, a hydrocarbyl group, an alkylene group joined to $R^5$ when Y is $C=N-R^5$ to form a cyclic moiety, $-R^6OR^7$, or $-R^8NR^9R^{10}$,
$R^4$ is H or a hydrocarbyl group,
$R^5$ is H or an alkylene group joined with $R^3$ when X is $NR^3$ to form a cyclic moiety,
$R^6$ is an alkylene group,
$R^7$ is H or a hydrocarbyl group,
$R^8$ is an alkylene group, and
$R^9$ and $R^{10}$ are each independently H or hydrocarbyl groups, or $R^9$ and $R^{10}$ are hydrocarbylene groups joined together to form a heterocyclic moiety, provided that when Y is $CH_2$ and X is $NR^3$, $R^3$ is not a hydrocarbyl group.

Lubricants characterized by structure (I) include 5-membered cyclic anhydrides, lactones, lactams and derivatives thereof. The hydrocarbyl group R may contain from 1 to about 50 carbon atoms and more generally will contain from 1 to about 20 carbon atoms. One particularly preferred range for the hydrocarbyl group R is from 5 to about 15 carbon atoms. The hydrocarbyl groups $R^3$, $R^4$, $R^7$, $R^9$ and $R^{10}$ as well as the hydrocarbylene groups $R^9$ and $R^{10}$ generally will contain from 1 to about 20 carbon atoms, and in another embodiment will contain from 1 to about 10 carbon atoms.

The organic lubricants characterized by structure (I) are free of acetylenic and aromatic unsaturation. Compounds similar to those represented by structure (I) which contain acetylenic or aromatic unsaturation generally are insoluble in the fluorine-containing hydrocarbons and are, in particular, insoluble in 1,1,1,2-tetrafluoroethane. The soluble organic lubricants of the present invention also are preferably free of olefinic unsaturation except that some olefinic unsaturation may be present in the hydrocarbyl group R without adversely affecting solubility.

Cyclic compounds of the type useful in the present invention and represented by structure (I) can be prepared by known techniques utilizing, for example, carboxylic acids, polycarboxylic acids or polycarboxylic esters or anhydrides as starting materials. For example, some of the cyclic materials characterized by structure (I), particularly where X is $-NR^3$ can be prepared by reacting carboxylic acids, anhydrides or esters with amines including diamines.

Specific examples of cyclic compounds of the type represented by structure (I) which are useful as lubricants in the liquid compositions of the present invention are illustrated in the following Table II.

TABLE II

Cyclic Lubricants (I)

| Ex. | R | Y | X |
|---|---|---|---|
| (1) | Propylene Tetramer | C=O | N—CH₃ |
| (2) | Propylene Tetramer | C=O | N—(CH₂)₃—N (with piperidinone ring, C=O) |
| (3) | H | $CH_2$ | N-dodecyl |
| (4) | H | $CH_2$ | N(CH₂)₃N (with morpholine ring, O) |
| (5) | H | $CH_2$ | N(CH₂)₆N (with piperidinone ring, C=O) |

TABLE II-continued

Cyclic Lubricants

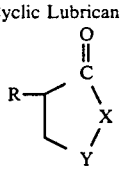
(I)

| Ex. | R | Y | X |
|---|---|---|---|
| (6) | Propylene Tetramer | C=N—(CH$_2$)$_3$ | N |
| (7) | CH$_3$O(O)CCH$_2$— | CH(decyl) | O |
| (8) | Propylene Tetramer | C=O | N—(CH$_2$)$_3$OC$_{11}$H$_{23}$ |
| (9) | Diisobutenyl | C=O | O |
| (10) | Propylene Tetramer | C=O | NH |
| (11) | Dodecyl | C=O | N(CH$_2$)$_3$OC$_{11}$H$_{23}$ |

As illustrated below, compounds of the type such as Example 1 can be prepared by reacting a substituted succinic anhydride with an amine. Example 2 and similar materials can be prepared by reacting alkenylsubstituted succinic acid or anhydride with an amino alkyl pyrrolidinone, and lubricants such as Example 4 can be prepared by reacting 4-butyrolactone with aminopropyl morpholine. Lubricants similar to Example 5 can be prepared by reacting 4-butyrolactone with a diamine such as 1,6-hexanediamine. Bicyclic lubricants of the type represented by Example 6 are prepared by reacting a substituted succinic anhydride with a diamine such as 1,3-propanediamine.

The preparation of specific examples of cyclic compounds characterized by structure (I) is illustrated in the following examples.

EXAMPLE 1

A propylene tetramer-substituted succinic anhydride (350 parts, 1.3 moles) is charged to a 1-liter flask and heated to about 50° C. To the heated anhydride are added 107 parts (1.4 moles) of an aqueous methylamine solution containing 40% methylamine. The amine solution is added at a rate to maintain the exotherm below 100° C. When the addition of the amine solution is completed, the reaction mixture is heated to the reflux temperature, and water is removed. When water no longer distills from the mixture, the residue is cooled and recovered. The residue is the desired product.

EXAMPLE 2

Into a reaction vessel there is charged 20 parts of xylene and 35.5 parts (0.25 mole) of N-(3-aminopropyl)-pyrrolidinone. To this mixture, 66.2 parts (0.25 mole) of the propylene tetramer-substituted succinic anhydride of Example 1 are added. The reaction is exothermic, and the mixture is stirred and heated to reflux upon completion of the anhydride addition. After heating at reflux for 1 hour, the mixture is stripped to 250° C. with nitrogen blowing. The residue is recovered and is the desired product containing 7.22% nitrogen (theory, 7.20).

EXAMPLE 3

The general procedure of Example 2 is repeated except that the pyrrolidinone is replaced by an equivalent amount of n-dodecylamine.

EXAMPLE 4

A mixture of 86 parts (1 mole) of 4-butyrolactone, 145 parts (1 mole) of aminopropyl morpholine and 30 parts of xylene is prepared and heated to reflux for 3 hours. The temperature of the reaction mixture is between 200° and 220° C. Water containing some aminopropyl morpholine is collected in a trap. An additional 16 parts of aminopropyl morpholine are added to the reaction mixture, and additional water containing some aminopropyl morpholine is collected in a trap over a period of 8 hours. After cooling the reaction mixture, the distillate is returned to the reaction flask, and the contents are heated to reflux for an additional 8 hours. The mixture then is cooled and distilled at reduced pressure. The product is collected at 125°-145° C. at 1.5 mm. pressure. The product obtained in this matter contains 13.26% nitrogen (theory, 13.21).

EXAMPLE 5

To 116 parts (1 mole) of 1,6-hexanediamine there are added 181 parts (2.1 moles) of 4-butyrolactone over a period of about 25 minutes. The temperature of the reaction mixture increases from about 30° to about 100° C. Xylene (35 parts) is added and the mixture is heated to reflux at 210°-250° C. for a total of about 6.5 hours while collecting a water/amine distillate. After cooling the reaction mixture to about 110° C., the distillate is returned to the reaction flask and 10 parts of xylene are added. The mixture is heated to the reflux temperature while collecting about 26 parts of distillate. An additional 3.5 parts of 1,6-hexanediamine are added, and after heating the mixture at 240°-250° C. for a total of 4 hours, the reaction mixture is distilled at a reduced pressure of 0.03 mm. The distillate is collected at a temperature of up to 173° C. (11 parts) and another fraction is collected at 173°-180° C. (221 parts). The fraction collected at 173°-180° C. is redistilled and the distillate is collected between 170° and 180° C. at 0.05 mm. (205 parts). This distillate is the desired product containing 10.94% nitrogen (theory, 11.11).

EXAMPLE 6

A mixture of 460 parts (6.2 moles) of 1,3-propanediamine and 50 parts of xylene is prepared. To this mixture there are added 798 parts (3 moles) of polypropylene tetramer-substituted succinic anhydride incrementally and with cooling over a period of 1 hour. The temperature of the reaction mixture increases from about 30° C. to about 100° C. After all of the anhydride is added, the mixture is heated and excess amine, water and xylene are removed by distillation over a period of about 1.5 hours. The mixture is allowed to cool and again heated to 260° C. for 2 hours. The reaction mixture is cooled to 70° C. and distilled at reduced pressure yielding 751.5 parts of distillate at 160°-180° C./0.3 mm. The distillate is redistilled at reduced pressure yielding 9 parts of distillate up to 160° C./0.3 mm. and 719 parts of distillate at 160°-170° C./0.2 mm. which is the desired product. The product obtained in this manner contains 9.39% nitro9en (theory, 9.21).

The cyclic lubricants utilized in the liquid compositions of the present invention are soluble in the fluorine-containing hydrocarbons and, in particular, in the fluorohydrocarbons such as 1,1,1,2-tetrafluoroethane. The lubricants are soluble over a wide temperature range and, in particular, at low temperatures. The solubility of the lubricants in 1,1,1,2-tetrafluoroethane at low temperatures is determined in the following manner. The lubricant (0.5 gram) is placed in a thick-walled glass vessel equipped with a removable pressure gauge. The tetrafluoroethane (4.5 grams) is condensed into the cooled (−40° C.) glass vessel, and the contents are warmed to the desired temperature and mixed to determine if the lubricant is soluble in the tetrafluoroethane. If soluble, the temperature of the mixture is reduced until a separation and/or precipitate is observed. The results of this solubility test conducted with several examples of the cyclic lubricants of the present invention are summarized in the following Table III.

TABLE III

| Liquid Containing Product of Example | Solubility °C. (ppt.) |
|---|---|
| 2 | −40 |
| 3 | −20 |
| 4 | −50 |
| 5 | −40 |
| 6 | <−30 |

The liquid compositions of the present invention comprise a major amount of a fluorine-containing hydrocarbon, and a minor amount of at least one soluble organic lubricant comprising a cyclic compound of the type described above with respect to structure (I). By "major amount" is meant an amount greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70 to about 99% of the fluorine-containing hydrocarbon and from about 1 to about 30% by weight of the lubricant. In other embodiments, the liquid compositions of the present invention may contain from about 5 to about 20% by weight of the lubricant.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in, and are most often excluded from the liquid compositions of the invention, particularly when the fluorine-containing hydrocarbon (A) contains no other halogen. Polyglycols and alkyl ethers which have been suggested in the prior art as useful solvents for fluorine-containing hydrocarbons are not required in the liquid compositions of the present invention and are generally omitted from the liquid compositions.

The additives which may included in the liquid compositions of the present invention to enhance the performance of the liquids include extreme-pressure and anti-wear agents, oxidation and thermal-stability improvers, corrosion-inhibitors, viscosity-index improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Stearically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic phosphates, organic alcohols, metal sulfonates, organic phosphites, etc. VI improvers include polyolefins such as polyesterbutene, polymethacrylate, polyalkyl styrenes, etc. Pour point and floc point depressants include polymethacrylates, ethylene-vinyl acetate copolymers, succinamic acid-olefin copolymers, ethylene-alpha olefin copolymers, etc. Detergents include sulfonates, long-chain alkyl-substituted aromatic sulfonic acids, phosphonates, phenylates, metal salts of alkyl phenols, alkyl phenolaldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

| | Parts by Wt. |
|---|---|
| Example A | |
| 1,1,1,2-tetrafluoroethane | 90 |
| Lubricant of Ex. 2 | 10 |
| Example B | |
| 1,1-dichloro-2,2,2-trifluoroethane | 85 |
| Lubricant of Ex. 4 | 15 |
| Example C | |
| 1,1,1,2-tetrafluoroethane (R134a) | 95 |
| Lubricant of Ex. 5 | 5 |
| Example D | |
| R134a | 80 |
| Lubricant of Ex. 6 | 20 |
| Example E | |
| R134a | 85 |
| Lubricant of Ex. 11 | 15 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A liquid composition comprising
   (A) a major amount of a fluorine containing hydrocarbon containing one or two carbon atoms, and
   (B) a minor amount of a soluble organic lubricant free of acetylenic and aromatic unsaturation and comprising a cyclic compound characterized by the following structure

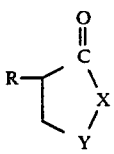

wherein
- R is H, a hydrocarbyl group having 5 to about 15 carbon atoms, or $-R^2COOR^1$,
- X is O or $NR^3$,
- Y is $CHR^4$, C=O, C=$NR^5$,
- $R^1$ is H or a lower hydrocarbyl group,
- $R^2$ is an alkylene group,
- $R^3$ is H, a hydrocarbyl group, an alkylene group joined to $R^5$ when Y is C=N—$R^5$ to form a cyclic moiety, $-R^6OR^7$, or $-R^8NR^9R^{10}$,
- $R^4$ is H or a hydrocarbyl group,
- $R^5$ is H or an alkylene group joined with $R^3$ when X is $NR^3$ to form a cyclic moiety,
- $R^6$ is an alkylene group,
- $R^7$ is H or a hydrocarbyl group,
- $R^8$ is an alkylene group, and
- $R^9$ and $R^{10}$ are each independently H or hydrocarbyl group, or $R^9$ and $R^{10}$ are hydrocarbylene groups joined together toから a heterocyclic moiety, provided that when Y is $CH_2$ and X is $NR^3$, $R^3$ is not a hydrocarbyl group.

2. The liquid composition of claim 1 wherein fluorine is the only halogen in the fluorine-containing hydrocarbon (A).

3. The liquid composition of claim 1 wherein the fluorine-containing hydrocarbon (A) is 1,1,1,2-tetrafluoroethane.

4. The liquid composition of claim 1 comprising from about 70 to about 99% by weight of the fluorine-containing hydrocarbon (A) and from about 1 to about 30% by weight of the soluble organic lubricant (B).

5. A liquid composition comprising
   (A) from about 70 to about 99% by weight of 1,1,1,2-tetrafluoroethane, and
   (B) from about 1 to about 30% by weight of a soluble organic lubricant free of acetylenic and aromatic unsaturation and comprising a cyclic compound characterized by the following structure

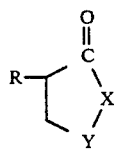

where
- R is H, a hydrocarbyl group having 5 to about 15 carbon atoms, or $-R^2COOR^1$ wherein $R^1$ is H or a lower hydrocarbyl group and $R^2$ is an alkylene group,
- X is O or $NR^3$,
- Y is C=O, $CH_2$ or C=N—$R^5$,
- $R^3$ is H, a hydrocarbyl group, $-R^8NR^9R^{10}$ or an alkylene group joined to $R^5$ when Y is C=$NR^5$ to form a cyclic moiety,
- $R^5$ is H or an alkylene group joined to $R^3$ when X is $NR^3$ to form a cyclic moiety,

- $R^8$ is an alkylene group, and
- $R^9$ and $R^{10}$ are hydrocarbylene groups joined together to form a cyclic moiety provided that when Y is $CH_2$ and X is $NR^3$, $R^3$ is not a hydrocarbyl group.

6. The liquid composition of claim 5 wherein X is O and Y is C=O.

7. The liquid composition of claim 5 wherein Y is C=O and X is $-NR^8NR^9R^{10}$.

8. The liquid composition of claim 5 wherein Y is C=O and X is O or $NR^3$ wherein $R^3$ is a lower hydrocarbyl group.

9. The liquid composition of claim 5 wherein the lubricant (B) is characterized by the structure

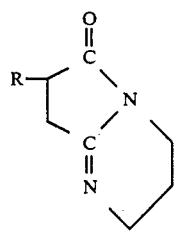

wherein R is a hydrocarbyl group containing from 1 to about 20 carbon atoms.

10. The liquid composition of claim 5 wherein lubricant (B) is characterized by the formula

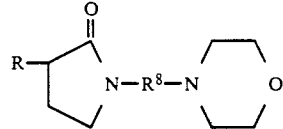

wherein R and $R^8$ are as defined in claim 5.

11. The liquid composition of claim 10 wherein R is H and $R^8$ contains from 2 to about 10 carbon atoms.

12. A liquid composition comprising:
   (A) about 70 to about 99 percent by weight of a fluorohydrocarbon having one or two carbon atoms; and
   (B) about 1 to about 30 percent by weight of a soluble lubricant having the formula:

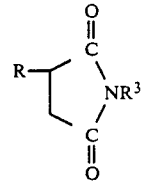

wherein R is H, a hydrocarbyl group, or $R^2COOR^1$ wherein $R^1$ is H or a lower hydrocarbyl group and $R^2$ is an alkylene group; $R^3$ is H, a hydrocarbyl group, $R^6OR^7$ where $R^6$ is an alkylene group and $R^7$ is H or a hydrocarbyl group; or $R^8NR^9R^{10}$ where $R^8$ is an alkylene group and $R^9$ and $R^{10}$ are independently H or hydrocarbyl groups or $R^9$ and $R^{10}$ are hydrocarbylene groups joined together to から a heterocyclic moiety.

13. The liquid composition of claim 12, wherein (A) is 1,1,1,2-tetrafluoroethane.

14. The liquid composition of claim 12, wherein $R^3$ is a hydrocarbyl group.

* * * * *